(12) United States Patent
Harrington et al.

(10) Patent No.: US 6,307,280 B1
(45) Date of Patent: Oct. 23, 2001

(54) DEVICE AND METHOD FOR DISABLING VEHICLE CONTROLS

(75) Inventors: Marie Irene Harrington, Troy; John Richard Troxell, Sterling Heights; Jeffery Alan Zuraski, Saginaw, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/347,405

(22) Filed: Jul. 6, 1999

(51) Int. Cl.[7] .................................................. B60R 22/00
(52) U.S. Cl. ........................ 307/10.6; 307/10.2; 307/10.3
(58) Field of Search .................................. 307/10.6, 10.1, 307/10.2, 10.3; 180/287; 123/352; 701/110; 340/426; 318/264; 280/735

(56) References Cited

U.S. PATENT DOCUMENTS

| | | | |
|---|---|---|---|
| 4,896,267 | * | 1/1990 | Frantz et al. ........................... 123/352 |
| 5,412,378 | * | 5/1995 | Clemens ................................ 307/10.2 |
| 5,893,582 | * | 4/1999 | Allen et al. ........................... 280/735 |
| 5,955,854 | * | 9/1999 | Zhang et al. .......................... 318/264 |

\* cited by examiner

*Primary Examiner*—Albert W. Paladini
(74) *Attorney, Agent, or Firm*—Jimmy L. Funke

(57) ABSTRACT

A device for disabling vehicle controls includes one or more switches that control a function. This device also has a sensor to detect a vehicle event. When the sensor detects a vehicle event, a controller prevents the switches from controlling that function.

23 Claims, 2 Drawing Sheets

DEVICE AND METHOD FOR DISABLING VEHICLE CONTROLS

TECHNICAL FIELD

The present invention relates generally to vehicle controls and more particularly, to a device and method for disabling vehicle electrical controls.

BACKGROUND ART

One of the recent trends in designing automobiles is to add various information and convenience features, including additional instruments and accessories. To accommodate these additional features, the number of switches and electronic controls to operate these features has also increased. One of the results of this trend is a proliferation of ancillary controls. This makes it more challenging for the driver to operate and adjust functions, which could result in distracting the driver from their main task of driving.

To alleviate this, many automobiles have switches mounted on, or in close proximity to, the steering wheel. These switches are used to control various functions, including radio settings, climate control settings, display settings, cruise control, windshield wipers, head up display, navigation, mobile multimedia and cellular phone along with many others. These switches allow the driver to change various settings while keeping their hands on the steering wheel without having to reach over to the instrument panel controls and with less possible distraction.

Unfortunately, because of the proximity of these switches and controls to the driver's hands, it is possible that one or more may be activated inadvertently during a vehicle event. Inadvertent switch activation can occur when the steering wheel is being turned or when the driver is honking the horn. Changing the settings of one of the above functions accidentally, such as sudden increases in radio volume is undesirable. The driver must also determine which switch was accidentally activated so the situation can be corrected. It would, therefore, be desirable to prevent these functions from changing during vehicle events.

SUMMARY OF THE INVENTION

It is, therefore, an object of the invention to provide an improved and reliable means for preventing certain vehicle systems from changing during a vehicle event. Another object of the invention is to provide a device and method for disabling vehicle controls in such situations.

In one aspect of the invention, a device for disabling vehicle controls includes one or more switches that control a function. This device also has a sensor to detect a vehicle event. When the sensor detects a certain vehicle event, a controller disables the switches responsible for controlling the ancillary vehicle function. In this way the ancillary vehicle function can not be accidentally or inadvertently changed during the vehicle event.

The present invention thus achieves an improved and reliable means for preventing functions from being accidentally or inadvertently changed during a vehicle event by disabling certain vehicle controls. Also, the present invention is advantageous in that it prevents the driver from being distracted in the middle of a vehicle event.

Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODE(S) FOR CARRYING OUT THE INVENTION

Figure 1:
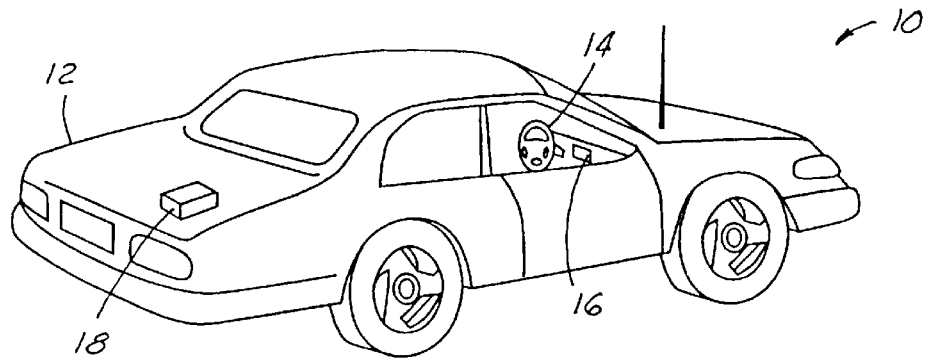
FIG. 1 is a perspective view of a vehicle control system.

Referring to FIG. 1, a vehicle control system 10 according to one embodiment of the present invention is illustrated. Vehicle control system 10 is located in a vehicle 12 and comprises a steering mechanism 14, an electronic device 16, and a controller 18. In the preferred embodiment steering mechanism 14 is a steering wheel 14, but one skilled in the art could develop alternative steering mechanisms, including, but not limited to, a joystick or yolk.

Figure 2:
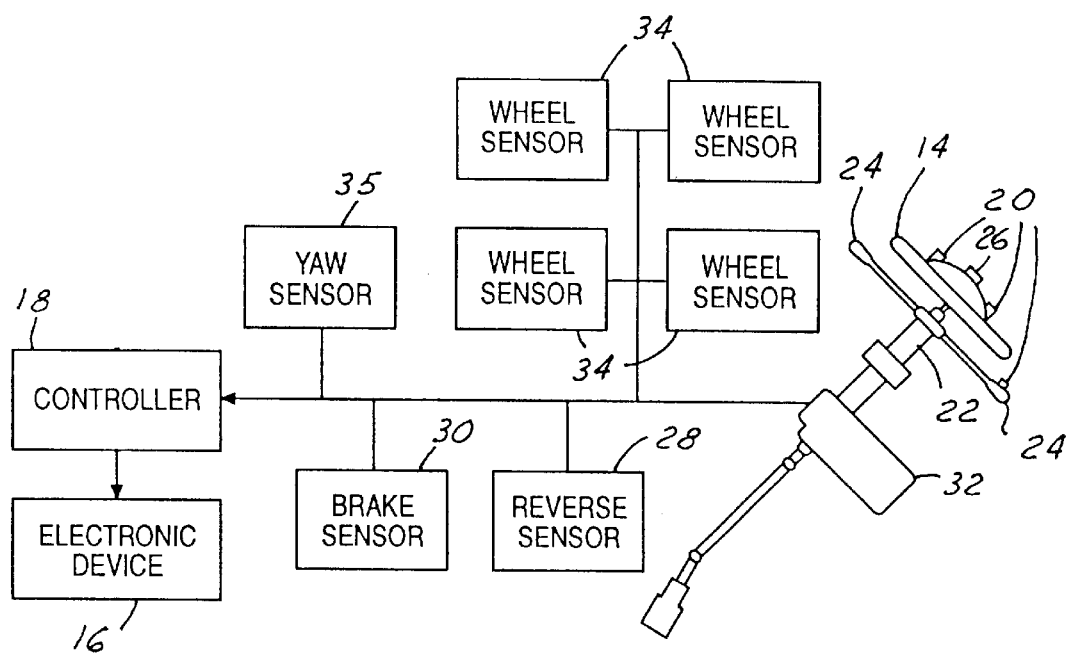
FIG. 2 is a block diagram depicting a system for disabling vehicle controls in accordance with the present invention.

Referring to FIG. 2, a block diagram depicting a system for disabling vehicle controls in accordance with the present invention is illustrated. The system for disabling vehicle controls has three major components, including the steering wheel 14, electronic device 16, and controller 18. The steering wheel 14 is mounted on a steering column 22 and is used to turn vehicle 12 (FIG. 1). One or more stalks 24 are also mounted on steering column 22 and in close proximity with steering wheel 14. For the convenience of the driver, one or more switches 20 are mounted on steering wheel 14, stalks 24 or a console (not shown) to control electronic device 16.

Electronic device 16 is an instrument, accessory, or feature located in vehicle 12 (FIG. 1). Electronic device 16 provides a function that can include, but is not limited to, radio setting, cruise control, climate control, display setting, windshield wipers, head up display, navigation, mobile multimedia and cellular phone along with many others. Electronic device 16 is coupled to and controlled by switches 20 in order to change one or more functions. Electronic device 16 is preferably microprocessor based.

Controller 18 is coupled to electronic device 16, switches 20 and a plurality of sensors. Controller 18 has an algorithm that uses data from one or more sensors or switches to determine when to disable one or more switches 20. When controller 18 disables one or more switches 20, these switches 20 no longer control electronic device 16. These sensors and switches can include, but are not limited to, a horn switch 26, a reverse sensor 28, a brake sensor 30, a steering wheel sensor 32, two or more wheel speed sensors 34 or a yaw sensor 35. Controller 18 is preferably microprocessor based.

The above sensors and switches are used to detect one of several vehicle events. Horn switch 26 is used to detect when the horn is being activated. Reverse sensor 28 is used to detect when the vehicle gear selection is reverse. Brake sensor 30 is used to detect when the vehicle is braking and if the vehicle is undergoing a braking event. Steering wheel sensor 32 is used to detect steering wheel motion (angular velocity or angular acceleration) to determine how fast the vehicle is changing angular direction. One or more wheel speed sensors 34 detect vehicle wheel speed, which determines vehicle velocity. The yaw sensor 35 or the difference between a pair of wheel speed sensors 34 can be used to determine the velocity and acceleration of vehicle angular change. Additional sources of vehicle information can be used in a similar manner.

In one example of the described invention, one or more switches 20 are mounted on steering wheel 14 and control electronic device 16. In the present example, electronic device 16 is a radio having several functions, including, but not limited to, volume, tuning, and selecting radio stations. For simplicity, controller 18 is integrated with the radio and is coupled to a steering wheel sensor 32. In the present invention, steering wheel switch 20 which is used for radio station selection is disabled from selecting a radio station whenever steering wheel 14 is turned a calibratable predetermined amount thus preventing the driver from being irritated by accidentally changing stations.

Figure 3:
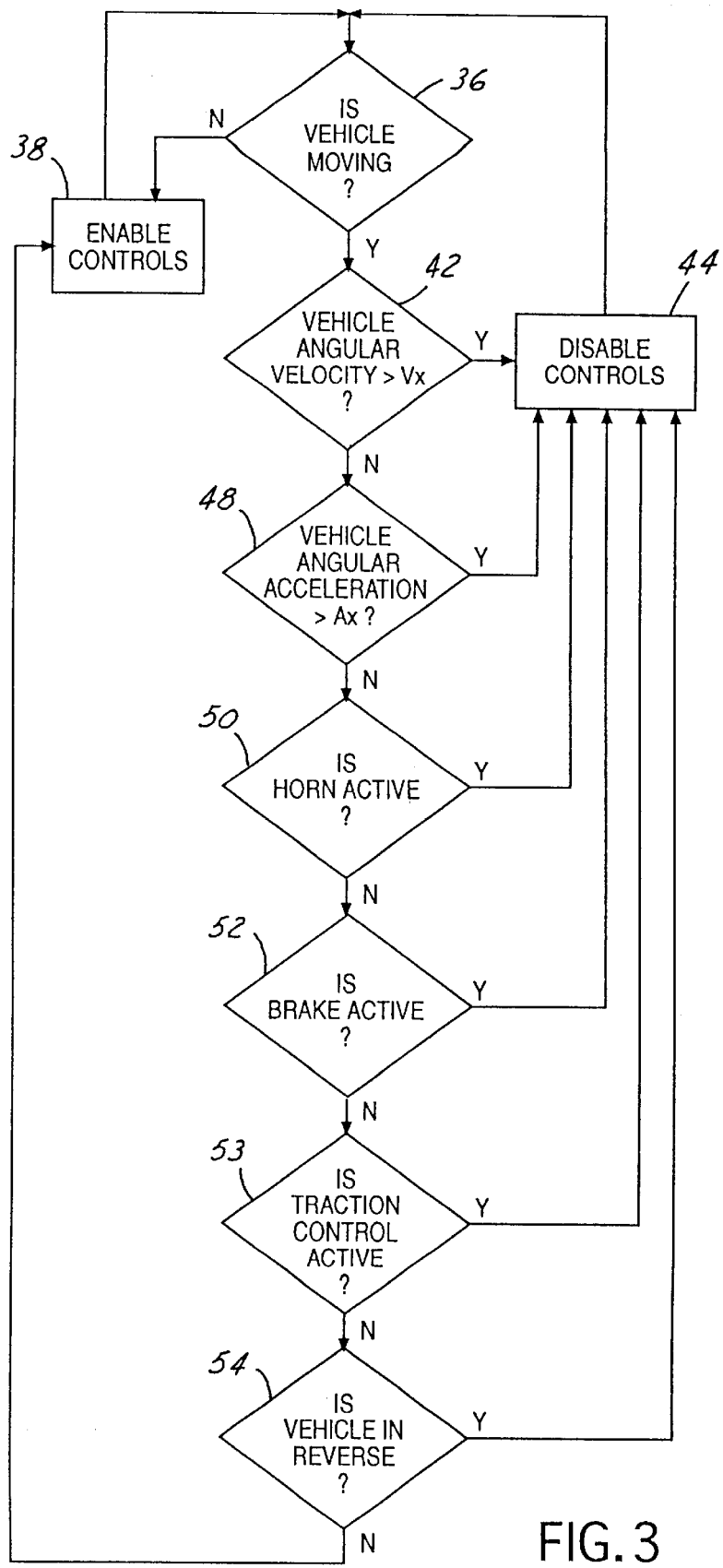
FIG. 3 is a flow chart depicting a method for disabling vehicle controls in accordance with the present invention.

Referring to FIG. 3, a flow chart depicting a method for disabling vehicle controls in accordance with the present invention is illustrated. Whenever a vehicle control is activated, vehicle motion is checked in step 36 to determine if the vehicle is moving. If the vehicle is not moving, then all vehicle controls are enabled and the sequence proceeds to step 38 after which the sequence repeats starting with step 36.

Referring back to step 36, if the vehicle is moving, then the sequence proceeds to step 42. Vehicle angular velocity is checked in step 42 as to whether the vehicle angular velocity is greater than a predetermined calibratable value corresponding to a value from which it will be known that selected vehicle controls should be disabled. If the vehicle angular velocity exceeds this predetermined calibratable amount, then the selected vehicle controls are disabled and the sequence proceeds to step 44 after which the sequence repeats starting with step 36.

Referring back to step 42, if the vehicle angular velocity is less than a predetermined calibratable value, then the sequence proceeds to step 48. Vehicle angular acceleration is checked in step 48 as to whether the vehicle angular acceleration is greater than a predetermined calibratable value corresponding to a value from which it will be known that selected vehicle controls should be disabled. If the vehicle angular velocity exceeds this predetermined calibratable amount, then the selected vehicle controls are disabled and the sequence proceeds to step 44 after which the sequence repeats starting with step 36.

Referring back to step 48, if the vehicle angular acceleration is less than a predetermined calibratable value, then the sequence proceeds to step 50. Horn switch activation is checked in step 50 as to whether the horn is being activated. If the horn is being activated, then selected vehicle controls are disabled and the sequence proceeds to step 44 after which the sequence repeats starting with step 36.

Referring back to step 50, if the horn switch is not activated, then the sequence proceeds to step 52. Brake activation is checked in step 52 as to whether the brake is being activated. If the brake is being activated, then selected vehicle controls are disabled and the sequence proceeds to step 44 after which the sequence repeats starting with step 36.

Referring back to step 52, if the brake is not activated, then the sequence proceeds to step 53. Traction control is checked in step 53 as to whether the vehicle is undergoing a traction control event. If a traction control event is occurring, then selected vehicle controls are disabled and the sequence proceeds to step 44 after which the sequence repeats starting with step 36.

Referring back to step 53, if a traction control event is not occurring, then the sequence proceeds to step 54. Vehicle gear selection is checked in step 54 as to whether the vehicle is in reverse. If the vehicle is in reverse, then selected vehicle controls are disabled and the sequence proceeds to step 44. On the other hand, if the vehicle is not in reverse, then the selected vehicle controls are enabled and the sequence proceeds to step 38 after which the sequence repeats starting with step 36.

The present invention thus achieves an improved and reliable means for preventing functions from changing during a vehicle event by disabling vehicle controls. Specifically, it reduces possible irritations to the driver and passengers during a vehicle event. It also eliminates the irritation of determining how to correct for an inadvertently activated switch.

From the foregoing, it can be seen that there has been brought to the art a new and improved device and method for disabling vehicle controls. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A device for disabling vehicle controls comprising:
   one or more operator controlled switches controlling a function, said switches located in close proximity to a steering wheel;
   a sensor for detecting a vehicle event; and
   a controller coupled to said sensor and said switches, said controller disabling said switches in response to said sensor detecting a vehicle event.

2. A device for disabling vehicle controls as recited in claim 1, wherein said switches are located on a stalk mounted on a steering wheel column.

3. A device for disabling vehicle controls as recited in claim 1, wherein said switches are located on a steering wheel.

4. A device for disabling vehicle controls during a vehicle event as recited in claim 1, wherein said switches are located on a steering wheel column.

5. A device for disabling vehicle controls as recited in claim 1, wherein said function is one selected from the group comprising: radio settings, cruise control, climate control, display settings, windshield wipers, head up display, navigation, mobile multimedia or cellular phone.

6. A device for disabling vehicle controls as recited in claim 1, wherein said vehicle event is activating a horn switch.

7. A device for disabling vehicle controls as recited in claim 1, wherein said vehicle event is driving in reverse.

8. A device for disabling vehicle controls as recited in claim 1, wherein said vehicle event is braking.

9. A device for disabling vehicle controls as recited in claim 1, wherein said vehicle event is active traction control.

10. A device for disabling vehicle controls as recited in claim 1, wherein said vehicle event is changing direction.

11. A device for disabling vehicle controls as recited in claim 10, wherein said sensor detects steering wheel motion.

12. A device for disabling vehicle controls as recited in claim 10, wherein said sensor detects vehicle wheel speed.

13. A method for disabling vehicle controls comprising the steps of:
   detecting a vehicle event; and disabling one or more operator controlled switches located in close proximity to a steering wheel in response to said vehicle event.

14. A method for disabling vehicle controls as recited in claim 13, wherein the step of detecting a vehicle event comprises detecting vehicle motion.

15. A method for disabling vehicle controls as recited in claim 13, wherein the step of detecting a vehicle event further comprises detecting steering wheel angular velocity.

16. A method for disabling vehicle controls as recited in claim 15, wherein the step of detecting steering wheel angular velocity comprises detecting vehicle wheel velocity.

17. A method for disabling vehicle controls as recited in claim 13, wherein the step of detecting a vehicle event further comprises detecting steering wheel angular acceleration.

18. A method for disabling vehicle controls as recited in claim 17, wherein the step of detecting steering wheel angular acceleration further comprises detecting vehicle wheel acceleration.

19. A method for disabling vehicle controls as recited in claim 13, wherein the step of detecting a vehicle event further comprises detecting horn activation.

20. A method for disabling vehicle controls as recited in claim 13, wherein the step of detecting a vehicle event further comprises detecting braking activity.

21. A method for disabling vehicle controls as recited in claim 13, wherein the step of detecting a vehicle event further comprises detecting reverse gear selection.

22. A method for disabling vehicle controls as recited in claim 13, wherein the step of detecting a vehicle event further comprises detecting active traction control.

23. A method for disabling vehicle controls as recited in claim 13, further comprising the step of enabling said switches in response to an end of said vehicle event.

* * * * *